US010653204B2

(12) United States Patent
Homer et al.

(10) Patent No.: US 10,653,204 B2
(45) Date of Patent: May 19, 2020

(54) HIGH PERFORMANCE FOOTBED AND METHOD OF MANUFACTURING SAME

(71) Applicant: Matmarket, LLC, Portsmouth, NH (US)

(72) Inventors: Von Maurice Homer, Middletown, DE (US); Charles Aaron Mutschler, Fort Lauderdale, FL (US); Heath Jarett Reinhartz, North Miami, FL (US); Gregory Diharce, North Hampton, NH (US); Kehlin Swain, Missouri City, TX (US)

(73) Assignee: MATMARKET, LLC, Portsmouth, NH (US)

(*) Notice: Subject to any disclaimer, the term of this patent is extended or adjusted under 35 U.S.C. 154(b) by 77 days.

(21) Appl. No.: 16/158,395

(22) Filed: Oct. 12, 2018

(65) Prior Publication Data
US 2019/0365024 A1 Dec. 5, 2019

Related U.S. Application Data

(60) Provisional application No. 62/677,582, filed on May 29, 2018.

(51) Int. Cl.
*A43B 7/14* (2006.01)
*A43B 3/00* (2006.01)
(Continued)

(52) U.S. Cl.
CPC ............ *A43B 7/141* (2013.01); *A43B 3/0036* (2013.01); *A43B 17/14* (2013.01); *G06F 17/18* (2013.01); *G06F 30/00* (2020.01)

(58) Field of Classification Search
None
See application file for complete search history.

(56) References Cited

U.S. PATENT DOCUMENTS 3,791,375 A * 2/1974 Pfeiffer ............... A61B 5/1036
600/592
3,974,491 A * 8/1976 Sipe .................... A61B 5/1036
340/573.1
(Continued)

FOREIGN PATENT DOCUMENTS

KR 100728075 B1 6/2007
KR 1020100087090 A 8/2010
(Continued)

OTHER PUBLICATIONS

Telfer et al., "The use of 3D surface scanning for the measurement and assessment of the human foot", 2010, Telfer and Woodburn Journal of foot and ankle research, pp. 1-9 (Year: 2010).*

*Primary Examiner* — Jason Lin
(74) *Attorney, Agent, or Firm* — Wei & Sleman LLP

(57) ABSTRACT

A footbed for use in footwear is provided. The footbed assembly includes a resilient, flexible material (e.g. EVA or PU foam) that extends the entire length of the footbed. a heel plate made from a material that is more rigid (plastic, carbon fiber) than the resilient foam attaches to the flexible material. The shape of the resilient footbed defines a geometry that provides support and comfort to the user by reducing peak pressures, improving cushioning, and enhancing foot support. The resilient foam and heel plate defines the shape of the midfoot R2 and rearfoot R1 of the footbed while the resilient flexible foam continues forward to define the shape of the forefoot R3 region of the footbed.

8 Claims, 6 Drawing Sheets

(51) Int. Cl.
  *G06F 17/18* (2006.01)
  *A43B 17/14* (2006.01)
  *G06F 30/00* (2020.01)

(56) References Cited

U.S. PATENT DOCUMENTS

| | | | | |
|---|---|---|---|---|
| 4,517,696 A * | 5/1985 | Schartz | A43D 1/00 | 12/1 R |
| 4,647,918 A * | 3/1987 | Goforth | A43B 3/0005 | 340/573.1 |
| 4,734,034 A * | 3/1988 | Maness | A61C 19/05 | 338/99 |
| 4,745,930 A * | 5/1988 | Confer | A43B 3/0005 | 600/592 |
| 4,813,436 A * | 3/1989 | Au | A61B 5/1038 | 356/620 |
| 4,856,993 A * | 8/1989 | Maness | A61C 19/05 | 433/68 |
| 4,862,743 A * | 9/1989 | Seitz | A61B 5/1036 | 73/172 |
| 4,876,758 A * | 10/1989 | Rolloff | A43B 7/28 | 12/142 N |
| 5,033,291 A * | 7/1991 | Podoloff | A61B 5/1036 | 73/172 |
| 5,079,949 A * | 1/1992 | Tamori | G06F 3/045 | 338/99 |
| 5,088,503 A * | 2/1992 | Seitz | A43D 1/022 | 12/142 N |
| 5,237,520 A * | 8/1993 | White | A43D 1/025 | 12/142 N |
| 5,253,656 A * | 10/1993 | Rincoe | A61B 5/1036 | 600/595 |
| 5,323,650 A * | 6/1994 | Fullen | A61B 5/1036 | 340/573.1 |
| 5,394,626 A * | 3/1995 | Brown | A43B 7/141 | 36/173 |
| 5,449,002 A * | 9/1995 | Goldman | A43B 17/00 | 600/592 |
| 5,449,256 A * | 9/1995 | Sundman | B23Q 11/0042 | 29/DIG. 56 |
| 5,593,699 A * | 1/1997 | Grassi | A43B 7/28 | 425/2 |
| 5,640,779 A * | 6/1997 | Rolloff | A43B 7/28 | 12/1 R |
| 5,678,448 A * | 10/1997 | Fullen | A61B 5/1036 | 600/592 |
| 5,790,256 A * | 8/1998 | Brown | A43D 1/02 | 33/3 R |
| 6,000,082 A * | 12/1999 | Nguyen | A43B 7/28 | 12/142 N |
| 6,026,351 A * | 2/2000 | Takeuchi | G01B 21/02 | 33/503 |
| 6,141,889 A * | 11/2000 | Baum | A43B 13/223 | 36/140 |
| 6,195,921 B1 * | 3/2001 | Truong | A43B 3/00 | 340/573.1 |
| 6,360,597 B1 * | 3/2002 | Hubbard, Jr. | A43B 3/00 | 73/172 |
| 6,463,351 B1 * | 10/2002 | Clynch | A61F 2/5046 | 623/901 |
| 6,735,547 B1 * | 5/2004 | Yfantis | A43D 1/025 | 702/155 |
| 6,804,571 B2 * | 10/2004 | Fullen | A43D 1/025 | 700/118 |
| 7,199,866 B2 * | 4/2007 | Gogolla | G01C 3/08 | 356/4.01 |
| 7,206,718 B2 * | 4/2007 | Cavanagh | A43B 17/00 | 702/155 |
| 7,346,418 B2 * | 3/2008 | Lowe | A43D 1/02 | 12/146 M |
| 7,402,148 B2 * | 7/2008 | Brewer | A61F 5/013 | 602/16 |
| D577,478 S * | 9/2008 | Peveto | D2/896 | |
| 7,617,068 B2 * | 11/2009 | Tadin | A61B 5/1036 | 356/2 |
| 7,661,170 B2 * | 2/2010 | Goode | A43B 5/04 | 12/1 R |
| 8,036,768 B2 * | 10/2011 | Lowe | A43D 1/02 | 12/146 M |
| 8,117,922 B2 * | 2/2012 | Xia | G06Q 30/02 | 73/862.041 |
| 8,170,705 B2 * | 5/2012 | Koelling | G07F 11/00 | 700/117 |
| 8,290,739 B2 * | 10/2012 | Tadin | A61B 5/1036 | 33/512 |
| 9,460,557 B1 * | 10/2016 | Tran | B29C 64/386 | |
| 9,721,384 B1 | 8/2017 | Tran et al. | | |
| 10,293,565 B1 * | 5/2019 | Tran | A61B 5/6807 | |
| 2001/0047194 A1 * | 11/2001 | Thompson | A61B 5/0031 | 607/59 |
| 2002/0144363 A1 * | 10/2002 | Royall | A43B 3/128 | 12/142 N |
| 2003/0179362 A1 * | 9/2003 | Osawa | G01B 11/002 | 356/4.09 |
| 2003/0191554 A1 * | 10/2003 | Russell | G06T 17/20 | 700/187 |
| 2004/0029639 A1 * | 2/2004 | Regan | G06Q 10/10 | 463/42 |
| 2004/0032052 A1 * | 2/2004 | Meyers | A61F 5/14 | 264/219 |
| 2004/0044296 A1 * | 3/2004 | Linton | A61B 5/107 | 600/595 |
| 2004/0133431 A1 * | 7/2004 | Udiljak | A43B 7/141 | 705/26.1 |
| 2004/0143452 A1 * | 7/2004 | Pattillo | A43D 1/02 | 600/300 |
| 2004/0168329 A1 * | 9/2004 | Ishimaru | A43D 1/02 | 33/3 R |
| 2006/0017021 A1 * | 1/2006 | Yoda | B82Y 10/00 | 250/492.23 |
| 2007/0033750 A1 * | 2/2007 | Cook | A43D 3/1458 | 12/134 |
| 2007/0055405 A1 * | 3/2007 | Koelling | G07F 11/00 | 700/232 |
| 2007/0118243 A1 * | 5/2007 | Schroeder | A61F 2/2875 | 700/118 |
| 2007/0250287 A1 * | 10/2007 | Spector | A43D 1/025 | 702/139 |
| 2010/0161076 A1 * | 6/2010 | Pallari | A61F 2/5046 | 623/36 |
| 2010/0183222 A1 * | 7/2010 | Fattal | G06K 9/527 | 382/166 |
| 2012/0078568 A1 * | 3/2012 | Koelling | G07F 11/00 | 702/138 |
| 2014/0160123 A1 * | 6/2014 | Yang | G06T 17/00 | 345/420 |
| 2015/0257485 A1 | 9/2015 | Finkelstein | | |
| 2016/0113356 A1 * | 4/2016 | Clough | A43D 3/027 | 36/71.5 |
| 2016/0202755 A1 * | 7/2016 | Connor | A61B 5/1126 | 73/865.4 |
| 2017/0252981 A1 * | 9/2017 | Li | B29C 64/40 | |
| 2018/0300791 A1 * | 10/2018 | Ganesan | G06Q 30/0601 | |

FOREIGN PATENT DOCUMENTS

KR 101223238 B1 * 1/2013
KR 101223238 B1   1/2013

* cited by examiner

HIGH PERFORMANCE FOOTBED AND METHOD OF MANUFACTURING SAME

CROSS-REFERENCE TO RELATED APPLICATIONS

The present application claims priority to U.S. Provisional Application Ser. No. 62/677,582, filed on May 29, 2018, the contents of which are hereby fully incorporated by reference as if fully set forth herein.

FIELD OF THE DISCLOSURE

The present disclosure generally relates to footbeds used in footwear and used with footwear of all types including casual, dress, work, and athletic footwear. More specifically, the present disclosure relates to footbeds that provide superior comfort and performance to a larger segment of the population, and methods of manufacturing same.

BACKGROUND OF THE DISCLOSURE

Footbeds (also commonly referred to as sockliners or insoles) are a common component of many types of footwear with a large variation in design, shape, materials, cost, and overall quality. Much of this variation exists between footwear categories and footwear brands to adapt the design of the footbed into the design of the shoe, the intended consumer (athlete, casual, etc.), and price point of the footwear product.

Footbeds are a primary source of comfort and function in footwear as they are in direct contact with the plantar surface of the foot where high loads and pressures are realized. Typically, footbeds are made from a relatively thin (3.0-5.0 mm) layer of foam topped by a thin polyester fabric (top cover) that is adhered to the foam.

The footbed is often a flat piece of foam that does not provide sufficient cushioning, pressure reduction, and support for the foot. Footbeds that are molded only from inexpensive foam will quickly breakdown and take a compression set. This compression set changes the shape of the footbed and reduces the cushioning capability by as much as 75%, thus effecting overall comfort and support for the foot. Additionally, standard insoles provide inferior performance due to variance in foot shapes and sizes.

SUMMARY OF THE DISCLOSURE

In some examples, a method of manufacturing a foot insert includes choosing a sample patient population, positioning each patient's foot in a sub-talar neutral position, collecting three-dimensional data of at least one foot of each patient and placing the scan in a collection of scans representing the sample patient population, separating the collection of scans into groupings based on each patient's preferred shoe size, aligning the scans within each grouping by using correspondence point pairs, obtaining contour data from the scans, applying at least one filter to the scans, averaging the scans, obtaining seven representative measurements for each grouping, the seven representative measurements including forefoot width, rearfoot width, arch height, arch length, heel-to-head of first metatarsal phalangeal joint, heel-to-head of fifth metatarsal phalangeal joint, and foot length, and forming an insole based on the seven representative measurements.

BRIEF DESCRIPTION OF THE DISCLOSURE

Various embodiments of the presently disclosed devices and methods are shown herein with reference to the drawings, wherein.

Figure 4:
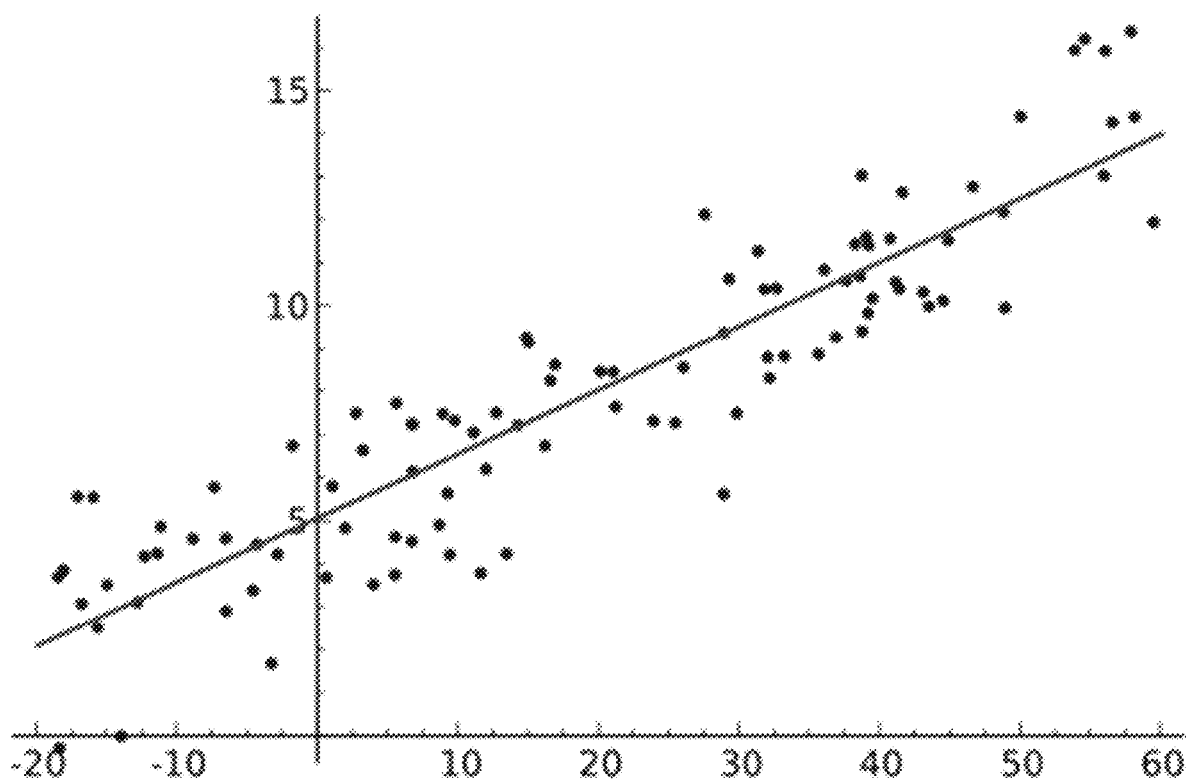
Figure 5:
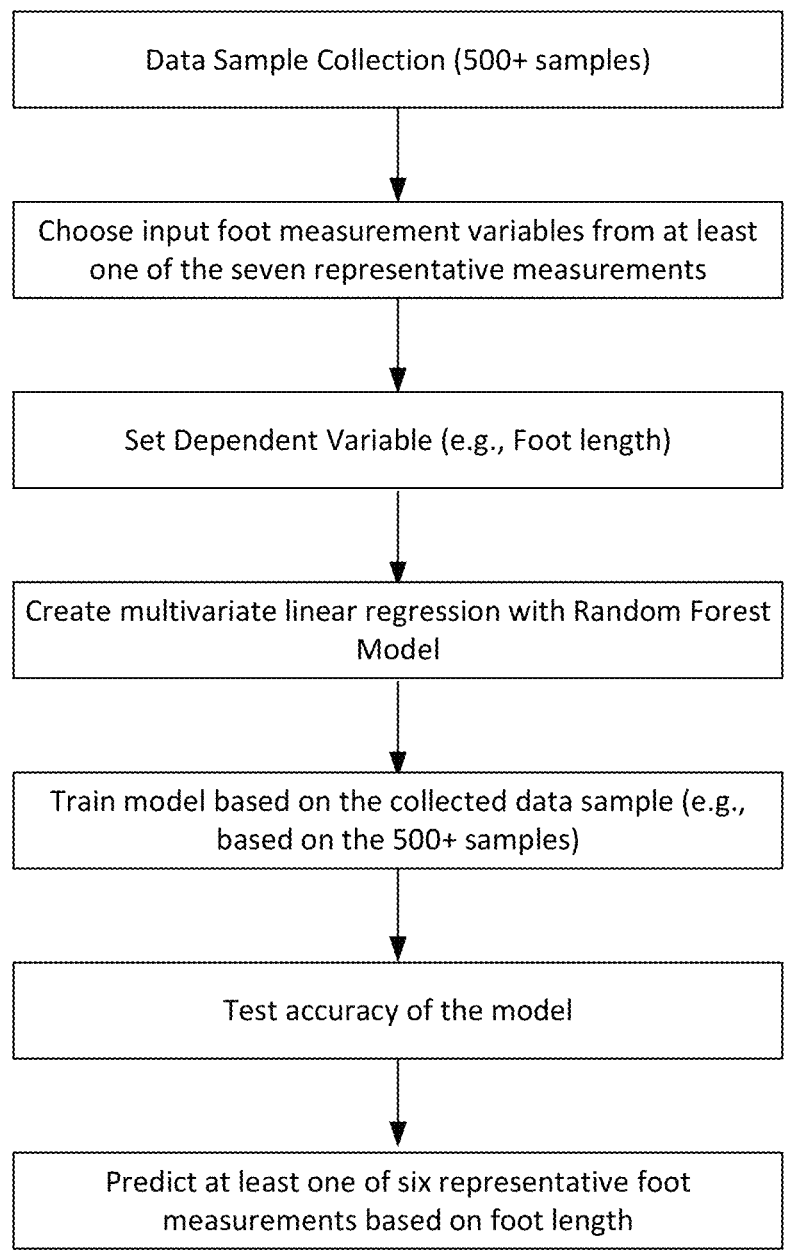
Figure 6:
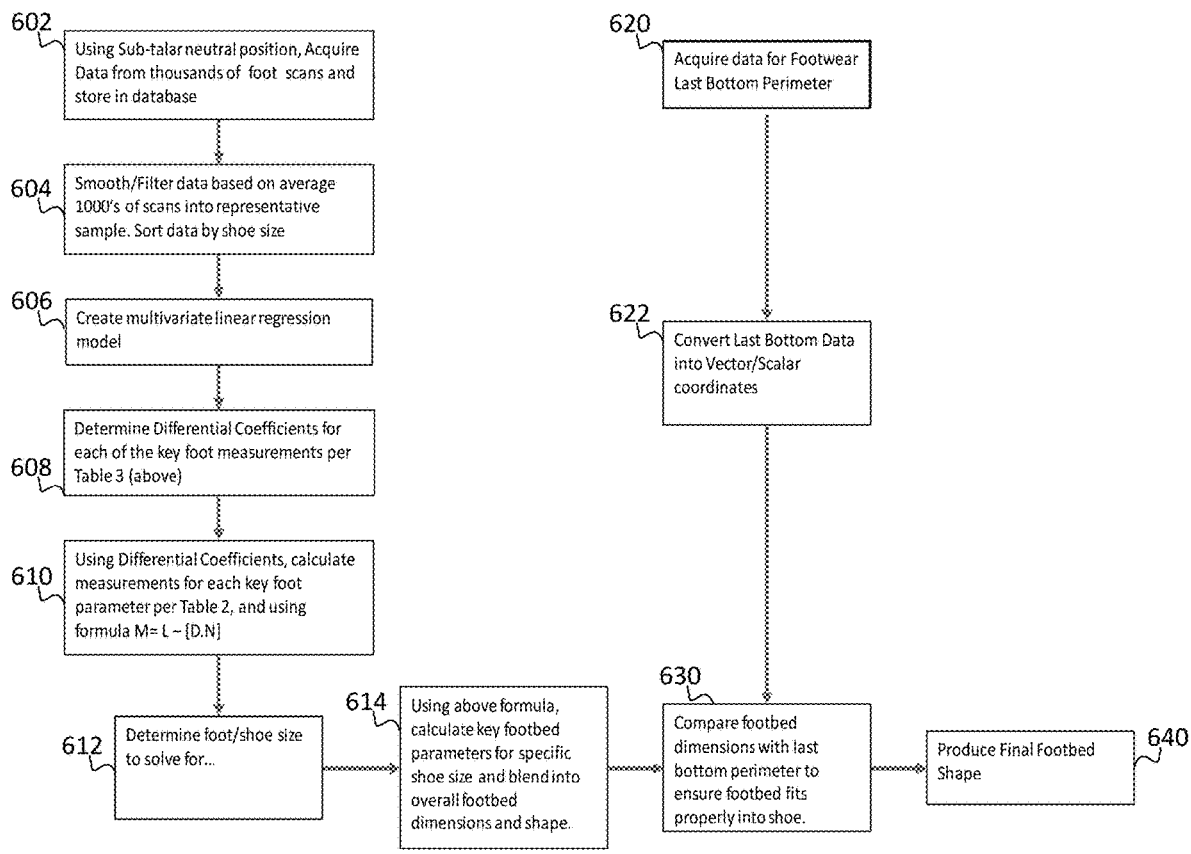

FIG. 3A-E is a schematic showing the locations of the seven representative measurements;

FIG. 4 is an illustrative model showing one example of a regression analysis;

FIG. 5 is a flow chart showing certain steps in creating a regression model; and FIG. 6 is a diagram showing certain steps, including optional steps, that may be used in manufacturing an insole.

Various embodiments of the present invention will now be described with reference to the appended drawings. It is to be appreciated that these drawings depict only some embodiments of the invention and are therefore not to be considered limiting of its scope.

DETAILED DESCRIPTION

Despite the various improvements that have been made to footwear and their methods of manufacture, conventional devices suffer from some shortcomings as described above.

Footbeds may include a shape in the top surface that attempts to match the contours of the foot. These footbeds can be made with more durable materials such as polyurethane foams and support structures made with composite materials such as injected plastics and carbon fiber so the footbed shape is maintained. Footbeds from corporations such as Spenco Medical Corp. and Superfeet Worldwide are examples.

Higher quality materials may be used to produce such footbeds, including materials that are more durable, stiffer, and shaped to match the foot. It should be understood that using more durable, higher quality materials will reduce the breakdown of materials and maintain the like-new performance.

However, matching the shape of the plantar foot surface is a complicated process. Footbeds with flat profiles are less effective but can be used with the majority of the population of shoe wearers since there is no attempt to match the foot's plantar surface profile. Conversely, footbeds with curvatures that match the foot can be problematic if the specific geometry of a footbed does not match a particular wearer's foot geometry. A mismatch in this geometry will produce less than ideal results and possibly injury, and can be less effective than footbeds with flat profiles. As can easily be understood, there are billions of foot profiles and shapes within the population. The more specific the footbed shape, the less likely it is to fit a large segment of the population.

The effort to find a footbed geometry that works for a large population segment is a complicated and expensive task. As such, many footwear companies charged with designing footbeds do not have the necessary equipment or the business structure to invest the necessary resources. It is common practice in the footwear industry to produce footbed designs from foot data that represents a very small population segment and hope for the best. While this might solve immediate business needs, the performance of the footbed is often less than ideal.

Therefore, there is a need for further improvements to the devices, systems, and methods of forming footbeds. Among other advantages, the present disclosure may address one or more of these needs.

The footbed assemblies for footwear described herein are designed to provide exceptional comfort and support. The shape and eventual design of the footbed is configured to fit a large segment of the population and provide comfort and support, particularly in the heel and midfoot regions of the foot where comfort and support are most needed.

The dataset of footscans used to derive this optimized formula is among the largest ever used and includes more than 120,000 foot scans. This large dataset and the algorithms derived, ensures that the geometry will fit a large segment of the population and the comfort and support provided from the geometry will be among the best in the industry.

The footbed assemblies for footwear shown and described herein provides enhanced cushioning, comfort, and support. Additionally, the methods and designs provide the above features while fitting into common, production footwear without changing the fit of the shoe—a common problem with after-market footbeds that provide enhanced features by adding more material and volume to a footbed.

Figure 1:
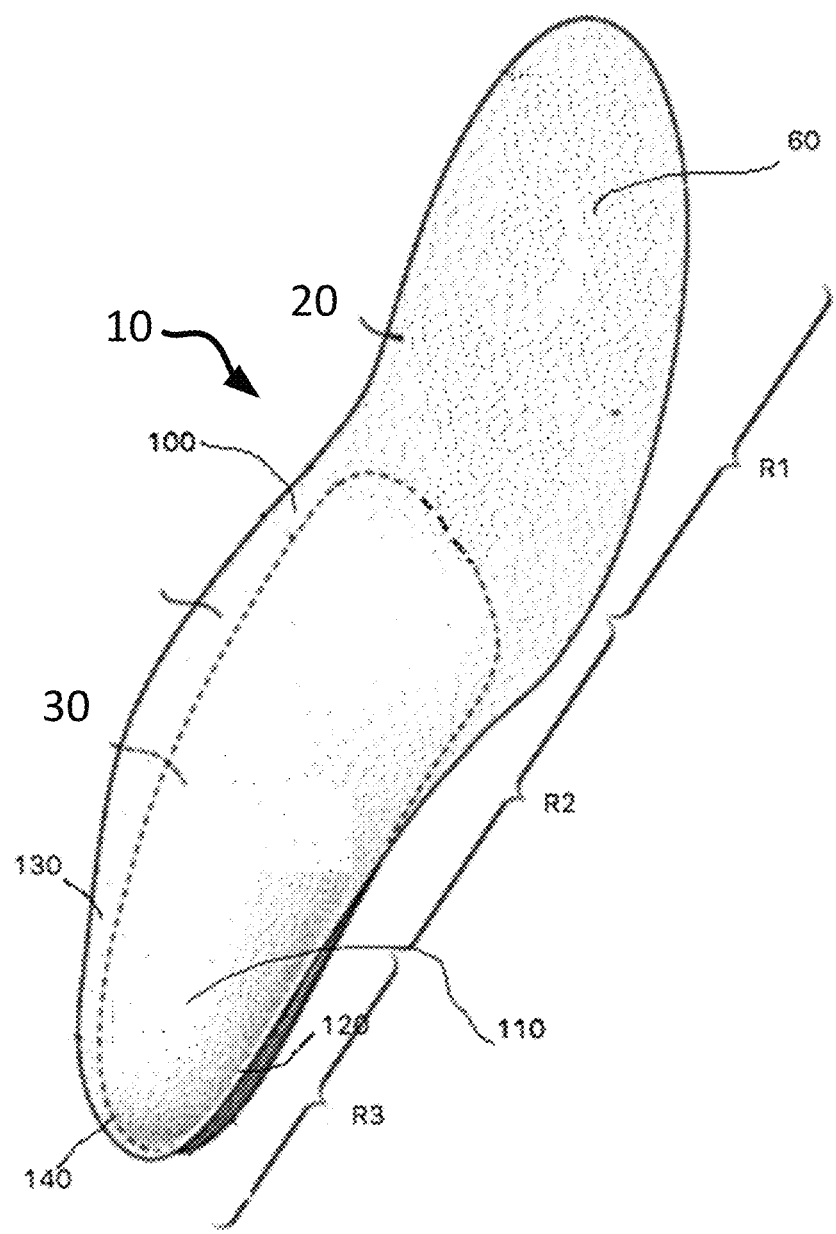
FIG. 1 is an isometric top view of the footbed assembly.
Figure 2:
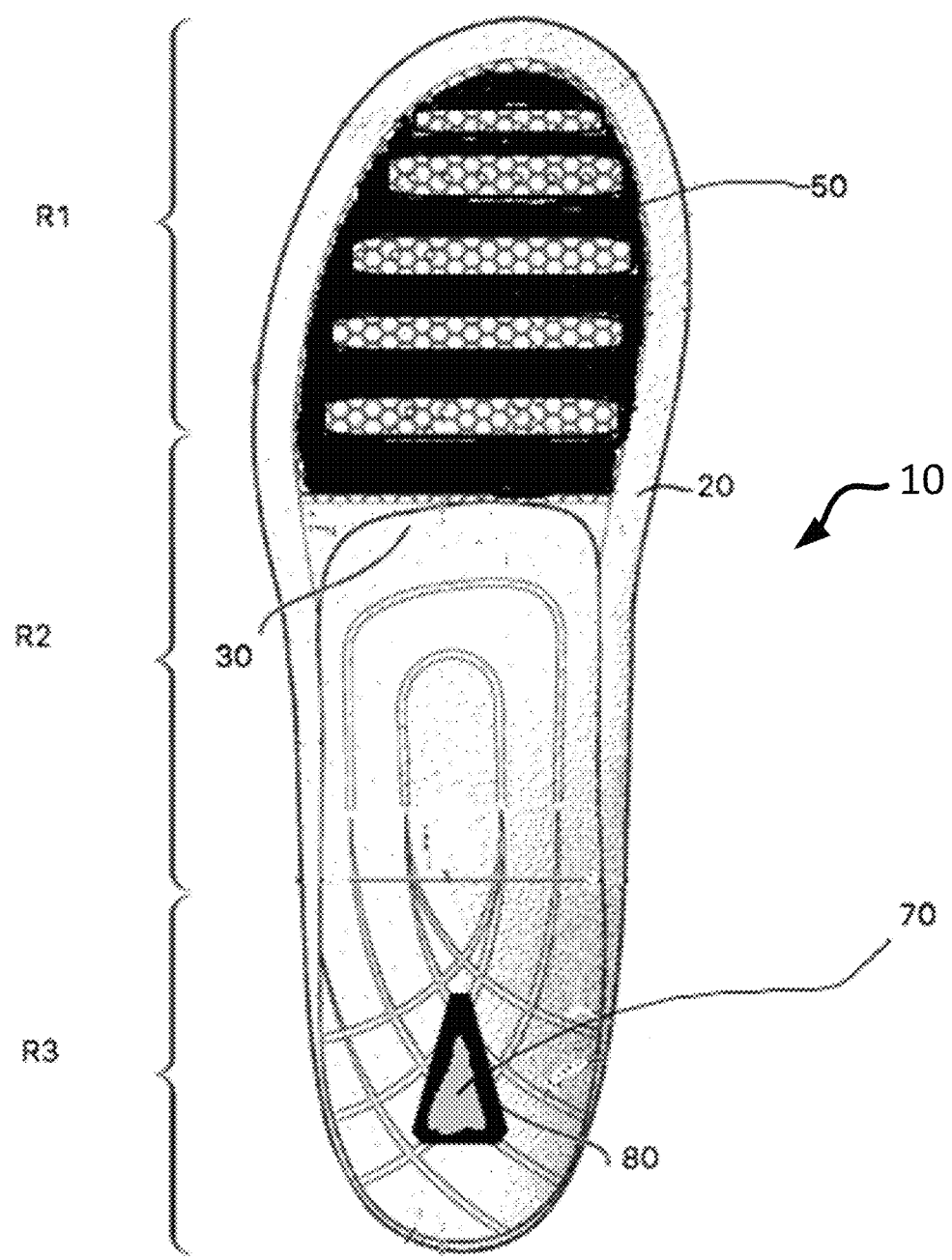
FIG. 2 is an bottom view of the bottom of the footbed assembly.

In some embodiments, a footbed 10 includes a foam layer 20 that runs the length of the footbed 10 from toe to heel, with a rigid or semi-rigid heel plate 30 attached to the full-length foam 20 and extending from the rear part of the footbed 10 to a point in the midfoot R2 as shown in FIGS. 1 and 2. The midfoot R2 point may be proximal to the position of first and fifth metatarsal heads of the foot. The heel plate 30 has a geometry designed to provide support and comfort to the heel and midfoot R2 region of the foot by improving cushioning and reducing pressure on the plantar foot surface.

The shape resembles the shape of the plantar surface of the foot. The rigidity of the heel plate 30 helps maintain the shape of the geometry. In the forefoot R3 and toe region of the footbed 10 a non-slip material 50 is adhered to the lower portion of the full-length foam 20 to add rigidity to the foam to keep the foam from wrinkling during use. Additionally, the non-slip material 50 keeps the footbed 10 from slipping forward in the shoe by adding friction between the footbed 10 and lasting board of the shoe. Ideally, the heel plate 30 includes a cutout 80 on the bottom of the heel plate that allows the full-length foam to protrude 70 through the semi-rigid heel plate such that the foam is in contact with the shoe's lasting board providing shock absorption. Additionally, the foam protruding 70 through the heel plate will add friction between the shoe's lasting board and the footbed 10 providing additional friction and aid in keeping the footbed 10 from moving during use. The protruding foam 70, due to its compliance, also supplies additional shock absorption as the foam 70 compresses during loading prior to the semi-rigid heel plate 30 contacting the lasting board.

Some of the components of a footbed according to this disclosure are shown in FIGS. 1 and 2, and the following nomenclature may be used throughout the specification to describe some of these components:

| Number | Component/Area |
|---|---|
| 10 | Footbed |
| 20 | Full Length Foam Base |
| 30 | Heel Plate |
| 40 | Midfoot Arch |

-continued

| Number | Component/Area |
|---|---|
| 50 | Non-slip forefoot |
| 60 | Top Cover |
| 70 | Heel Plate Foam Projection |
| 80 | Heel Plate Cut Out |
| 90 | Heel Cup Wall |
| 100 | Height of Arch |
| 110 | Heel Cup |
| 120 | Lateral Heel Cup Wall |
| 130 | Medial Heel Cup Wall |
| 140 | Rear Heel Cup Wall |
| R1 | Rearfoot Region of Footbed |
| R2 | Midfoot Region of Footbed |
| R3 | Forefoot Region of Footbed |

Additionally, certain measurements may be used throughout the specification to describe the footbed including the heel cup depth, heel cup diameter, length to front of heel plate, slope/angle of heel cup wall at medial, lateral, rear side locations, heel plate cutout shape (shown in a guitar pick shape), heel plate foam projection, the distance protruding through the guitar pick hole, the arch height, the arch spring, and the slope from bottom of heel cup to top of arch.

As used herein the "footbed length" refers to the distance from the back of the heel to the front of the toe, "footbed width" refers to the distance at the widest point of the forefoot, "heel width" refers to the distance at the widest point of the heel, "heel plate length" refers to the distance from the back of the heel plate to the front of the heel plate, "heel plate width at heel" refers to the distance at the widest point of the heel plate in heel region, "heel plate width at arch" refers to the width from the medial side of the heel plate to the lateral side of heel plate at the arch, "forefoot thickness" refers to the thickness of foam in the forefoot region, "heel cup wall height (later, medial, rear)" refers to the perpendicular height distance from top of the heel cup wall to the center of the heel, "heel cup wall angle (lateral, medial, rear)" refers to angle of the heel cup wall from the base of the heel to top of wall, "arch height" refers to the perpendicular height from top of arch to base of heel, and "arch spring from lasting board" refers to the distance from lasting board to bottom surface of arch.

The footbed base 20 may be made from a resilient foam material produced with techniques such as injection or compression molding and made from materials such as foamed polyurethane or foamed ethylvinyl acetate (EVA). Additional and less common foams known to the industry such as foamed rubber or Polyethelene (PE) foam may also be used. The foam is typically of a specific gravity (SG) ranging from 0.15-0.40 with a material hardness between 15 & 50 on the asker C scale. These types of foams are common in the footwear industry and known to provide quality cushioning and comfort characteristics to the wearer. The footbed base 20 is of a relatively consistent thickness throughout the footbed 10 with thicker sections in the midfoot R2 to accommodate the arch area 40 and shaped to match the plantar foot surface. The heel plate 30 is made from a material that is more rigid than the foam 20 used for the footbed base 20 and is commonly made from a plastic material that is produced via injection or compression molding techniques. Plastics used for the heel plate 30 may include nylon, polyurethane, EVA, polycarbonate, and peebax. These plastics have a specific gravity in the range of 1.0-1.2 and when molded with the above techniques have a hardness of 50-90 on the shore A scale. Composites such as carbon fiber may also be used with physical characteristics similar to the plastics mentioned above.

The heel plate 30 is adhered to the bottom surface of the footbed base 20 in the heel region R1 and the non-slip material 50 is adhered to the bottom surface of the footbed base 20 in the forefoot R3 region of the footbed 10. The materials may be adhered to each other using adhesives known in the industry or by co-molding the materials via heat and pressure that effectively melts the outer layer of each material to the other.

The heel plate 30 provides the primary shape of the footbed 10 with a stiffness and materials that resists long term deformation. The heel plate 30 is attached to the footbed base foam 20 using standard adhesives known in the industry. With the footbed base 20 foam adhered to the heel plate 30, the foam takes the shape of the heel plate 30 and thus has the optimized geometry to match the plantar foot surface. The heel plate is adhered to and positioned on the footbed base 20 from a point furthest in the heel to a point in the midfoot R2 that is proximal to the $1^{st}$ and $5^{th}$ metatarsal heads of the foot to ensure comfort and compliance at the bending joints of the foot.

The contours of the heel plate 30 that provide the primary shape of the footbed 10 are critical for comfort and support of the foot. Areas within this shape that are significant to the function of the footbed 10 include the heel cup depth, heel cup diameter, medial heel cup wall angle, lateral heel cup wall angle, rear heel cup wall angle, medial heel cup wall height, lateral heel cup wall height, rear heel cup wall height, arch height, and arch spring.

Providing a geometry that closely matches the contours of the foot will provide needed support and comfort. It will be appreciated that matching the contours of the foot will reduce the pressure realized at any given point of the foot. Since pressure=force/surface area and the force exerted at the junction of the human foot and footbed is a constant for an individual (largely determined by body weight and gait style), increasing contact surface area at a constant force reduces pressure. Thus, matching the contours of the foot is important in reducing pressure. Pressure is a major contributor to comfort as can be demonstrated by anyone who has stepped on a small object (a pebble) in unshod feet. The force is constant (body weight, gait) but the surface area is greatly reduced at the point of contact with the small object. The force (body weight, gait) is now distributed over a small surface area (pebble), pressure increases drastically, and discomfort (pain) occurs.

Additionally, support and stability of the foot can be improved via a better footbed geometry. Supporting critical areas of the plantar foot surface will help control gait, reduce foot pronation, provide arch support, and improve shock absorption. For example, heel cup wall height and heel cup wall angle support the sides of the heel and increase stability. A more stable heel will create better stability for the foot and lower extremities. The arch profile may also be important for stability as it supports the medial arch of the foot. Better support of the medial arch will enhance stability and reduce pronation at the ankle. In turn, this will enhance stability throughout the lower extremity of the body. Those familiar with the kinetic chain in the human gait will understand that instability seen at the foot will quickly propagate up the kinetic chain at the other joints of the lower extremity (ankle, knee, hip), forcing the body to counteract the unstable motion.

In addition to improving overall comfort and support, shock absorption may be improved via footbed geometry. In will be appreciated that increased contact surface area between the foot and optimized footbed 10 allows for greater recruitment of the cushioning material (footbed base 20) as more material is used to absorb impact forces of the gait. As contact surface area is increased, it effectively incorporates more cushioning material into the shock absorption response.

Additional shock absorption, comfort, and control in in the arch of the foot is achieved by providing a spring in the arch of the foot. When combined with the footbed base 20 the heel plate 30 is molded to a shape that elevates the bottom surface of the arch area of the heel plate 30 from the lasting board of the shoe. This effectively creates a leaf spring configuration in the arch area of the footbed 10. As can be appreciated, the leaf spring allows the heel plate 30 and footbed base 20 to collapse slightly when force is applied, producing a cushioning effect as well as allowing the arch to adapt to a specific wearer's foot.

Providing a shape that matches the contour of the foot is beneficial to comfort, support, and cushioning but creates a challenge when manufacturing a singular (non-customized) product for a large population. The large variation in shape, size, and profile of the plantar foot surface in a given population means that a shape that might be comfortable for one individual will produce discomfort in a second individual. Thus, engineering certain predetermined shapes, derived from a large population is desired in the design of a footbed where a single manufactured shape is used to create a product that has the greatest effect for a large percentage of the population. The shapes of the footbed according to the current disclosure were derived from calculations and algorithms based on a large population of 120,000 people. Creating a single product that can be used by a large population of people while providing good performance results benefits the users as it reduces the cost of the mass-produced product. Moreover, the production of such product reduces the complexity of the supply chain and the presentation of the product at retail and online sites.

It will be understood that a shape that matches the wearer's foot can be derived by creating a shape that is customized to an individual's foot. Footbeds commonly known as orthotics have been used in the medical industry for some time and are manufactured by taking a custom mold of a wearer's foot. While custom orthotics can provide good results in comfort and support, they come with a cost in time and money. These devices require time to take a custom mold of the wearer's foot and often cost hundreds of dollars to manufacture. Therefore, these devices are normally reserved for individuals with severe foot health problems.

While the combination of the footbed base 20 and heel plate 30 will provide the correct geometry for optimal footbed shape, it should be understood that someone experienced in the art can create a similar optimal shape using a different combination of materials. In a second embodiment of the invention the critical top shape of the footbed 10 can be produced via molding of PU or EVA foams or similar polymers. One schooled in the art can use compression molding, injection molding, or open pour molding combined with the correct polymers to mold a footbed 10 into the optimal shape that will provide comfort, cushioning and support that take into account parameters such as heel cup depth, heel cup diameter, medial heel wall angle, lateral heel wall angle, rear heel wall angle, medial heel wall height, lateral heel wall height, rear heel wall height, arch height, and arch spring.

Measurements: Table 1 shows a measurement profile for a footbed 10 that provides optimal comfort and support. It should be understood that small variations from each of the below measurements can be allowed and still achieve the desired results. The measurements below describe a footbed of a US size 9. Certain important measurements are prefaced with an asterisk.

TABLE 1

Footbed Measurement Profile

| | millimeters |
|---|---|
| Footbed Length | 296 |
| Forefoot Width | 102 |
| Heel Width | 70.5 |
| Heel Plate Length | 176.5 |
| Heel Plate Width at Heel | 67.0 |
| Heel Plate width at arch | 67.7 |
| Forefoot Thickness | 5.0 |
| Heel Cup Lateral Wall Height | 14.5 |
| Heel Cup Medial Wall Height | 16.4 |
| Heel Cup Rear Wall Height | 15.5 |
| Heel Cup Depth | 15.0 |
| Heel Cup Lateral Wall Angle | 43.3 |
| Heel Cup Medial Wall Angle | 43.9 |
| Heel Cup Rear Wall Angle | 42.7 |
| Arch Height | 15.8 |
| Arch Spring from Lasting Board | 4.9 |

As noted, the above measurements are for a footbed 10 designed to be used with a size 9 shoe. It should be understood that one experienced in the art may adapt the dimensions to different footbed sizes based on industry standard size grading and the instant algorithms.

To produce a certain profile for a shoe size, the process may begin through data collection. In the data collection process subjects have their feet scanned using a 3D scanner. Each subject's foot is placed in a neutral position by palpating the subtalar joint (STJ) to ensure the neutral position. Scanned files may be divided into subsets based on the subject's shoe size.

One-dimensional measurements may also be extracted from the scans and patients were categorized as according to gender and activity level. Heel to ball length and foot breadth were examined to determine if a difference existed between athletes and non-athletes. A One-Way Anova Analysis was conducted to assess differences between independent variables on a single dependent variable after controlling for the effects of one or more covariates. For example, in one analysis, mean arch height was compared by foot type and activity level. The control variables were heel to ball length and foot breadth, chosen specifically because of their known effects on the dependent variable.

Scanned files may then be aligned based on correspondence paired points. These points are anatomical and include the seven key or "representative" anatomical points outlined below. This ensures that all files are anatomically aligned.

From the scanned files, a 3D contour is extracted, the 3D contour is smoothed by processing it via a filter, such as, for example, a Poisson filter. A smooth mesh remains of the 3D foot scan of the sole of the foot. That data is then processed and analyzed based on heel to ball length and foot breadth to determine the shape and form factor of the orthotic insert.

In some examples, statistical analysis may be performed on the data, such as for example, an F-test. The F-test of significance will be used to assess the main and interaction effects. F is the between-groups variance (mean square) divided by the within-groups variance (mean square). When the F value is greater than 1, more variation occurs between groups than within groups. When this occurs, the computed p-value is small and a significant relationship exists. If significance is found, comparison of the original and adjusted group means can provide information about the role of the covariates. Because predictable variances known to be associated with the dependent variable are removed from the error term, ANCOVA increases the power of the F-test for the main effect or interaction. Essentially, it removes the undesirable variance in the dependent variable. The assumptions of normality and homogeneity of variance was assessed. Normality assumes that the scores are normally distributed (symmetrical bell shaped) and will be assessed using the one sample Kolmogorov Smirnov (KS) test. Homogeneity of variance assumes that both groups have equal error variances and will be assessed using Levene's test. If the assumption of normality is violated (skewed bell shaped), the p-value will be assessed with the Kruskal-Wallis H Test.

Figure 3A:
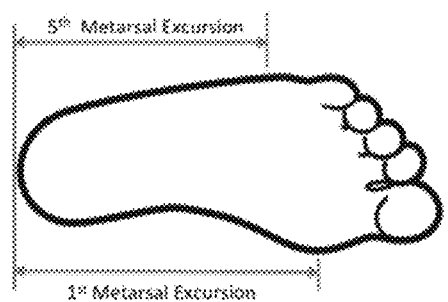

Seven key anatomical measurements are derived from the smoothed 3D contour. The seven key anatomical measurements are described below and include:

$1^{st}$ Metatarsal Excursion (or heel-to-head of first metatarsal phalangeal joint): This is the length from the back of the heel to the center of the $1^{st}$ metatarsal phalangeal joint ($1^{st}$ MPJ) as shown in FIG. 3A.

$5^{th}$ Metatarsal Excursion (or heel-to-head of fifth metatarsal phalangeal joint): This is the length from the back of the heel to the center of the 5th metatarsal phalangeal joint ($5^{th}$ MPJ)) as shown in FIG. 3A.

Figure 3B:
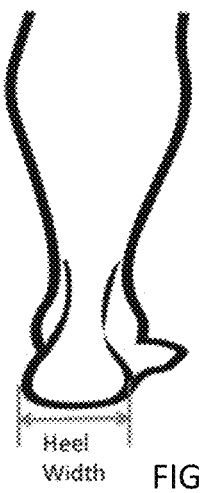

Heel Width: The width of the heel at its widest point as shown in FIG. 3B.

Figure 3C:
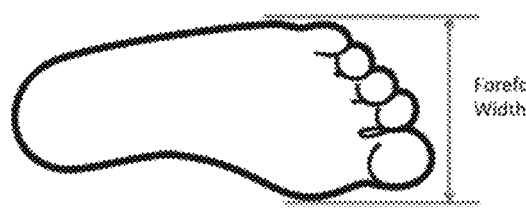

Forefoot Width: The width at the widest point of the forefoot; typically the distance from the medial side of the 1st MP joint to the lateral side of the $5^{th}$ MP joint as shown in FIG. 3C. Additionally, the forefoot width measurement is helpful in determining if the applied footwear has adequate room to accommodate the function and tissue expansion of the forefoot.

Figure 3D:
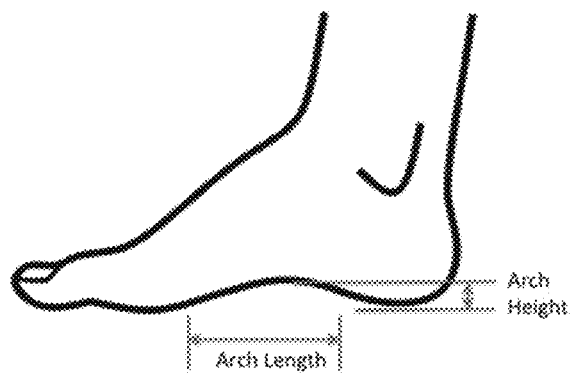

Arch Height: Height of the medial arch at its tallest point as shown in FIG. 3D. The medial arch absorbs and redistributes forces from the muscles in the leg and the ground back to the foot and body so that we are able to move fluently. The height of the arch can give us an idea of how well forces are generated and absorbed and reabsorbed. Just like the calcaneus there are thought to be several factors that influence arch height.

Arch Length: Length of the medial arch from where it starts close to the heel and proceeds distally to a point just proximal to the $1^{st}$ MPJ in the forefoot as shown in FIG. 3D.

Figure 3E:
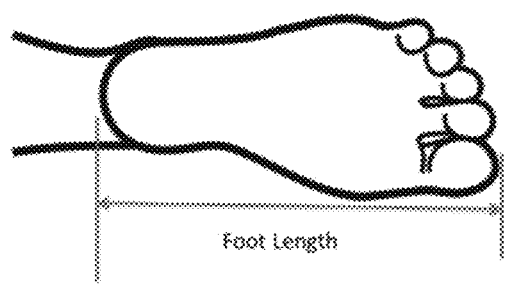

Foot Length: Length of the foot as measured from the back of the heel to the longest toe as shown in FIG. 3E. Typically the $1^{st}$ or $2^{nd}$ toe. This measurement gives us a ratio value of overall foot size, considering width, girth and length measurements of the arches that support the foot.

In some examples, these seven representative measurements are used to create a contoured shape insert with superior fit. Two measurements, in particular, produce an insert that is superior to others known in the art. Specifically, the first metatarsal length measurement and the fifth metatarsal length are not commonly used because there is too much variability in the lengths of these bones. Instead, research supporting the current disclosure has discovered that the variability of those particular bones has a lot to do with anthropometrics that is not considered during footwear measuring. Therefore, the algorithm and structural design of the insert normalizes and define the shape based on the variability of those two bones, which creates an insert that provides the best fit for virtually every foot and is taken from a calculation based on variations of those two specific parts of the foot in addition to the other measurements.

Example 1

In one example, the algorithm may be understood as having two steps. In a first step, the algorithm outlines how to fit footbed parameters into the average foot size standard parameters. In the second step, the algorithm will match different insoles with their approximate insole or (last bottom) parameters.

The footbeds described herein are configured specifically to provide best fit for any foot size inside any shoe. The methods employed via software help the user validate the values assigned to the size of specific footwear features as follows:

Step 1 Overview

A software having a method for foot sizing is contemplated which takes in certain variables that describe different parts of the foot. These variables may include the forefoot width, rear foot width, first ray length, fifth ray length and foot size. The software program outputs to the screen information regarding each of the foot parameters inputted by the user. Specifically, the program tells the user whether the input is within the range of measurement values for that specific foot parameter. For example, if the value is within the range, the output will display a message saying, "The output was valid." If the value is outside of the range, the message will say "Number is invalid" and also display the integer value needed to add or subtract from the input value to make the value within the range of valid values.

Independent and Dependent Variables

The algorithm utilizes independent and dependent variables in the data analysis. The independent variables may include forefoot width, rearfoot width, first ray length, fifth ray length and foot size. Alternatively, dependent variables are the selected dimensions of the insole last bottom blue print which will determine footbed dimension modifications.

Step 2 Logistic Regression Analysis

In some examples, six best-fit points were computed from point clouds of the foot scan raw data, the six best-fit points including forefoot width, rearfoot width, arch height, arch length, heel-to-head of first metatarsal phalangeal joint, and heel-to-head of fifth metatarsal phalangeal joint. The aforementioned F-test of significance was used as the statistical test to assess the main and interaction effects and determine the six best-fit points of the instant footbed. A decision tree learning algorithm was then used to predict the dependent variables for each foot size from the data (i.e., forefoot width, rearfoot width, arch height, arch length, heel-to-head of first metatarsal phalangeal joint, heel-to-head of fifth metatarsal phalangeal joint). This framework may be used to predict multivariate data including nonparametric regressions in which the predictor does not take a predetermined form but is constructed according to information derived from the data. Nonparametric regression requires larger sample sizes because the data must supply the model structure as well as the model estimates. In some examples, a nonparametric multiplicative regression (NPMR) is used, which is a form of nonparametric regression based on multiplicative kernel estimation. Like other regression methods, the goal is to estimate a response (dependent variable) based on one or more predictors (independent variables).

NPMR algorithms may enable the software to model automatically the complex interactions among predictors. The unknown parameters, denoted as {β} beta which may represent a scalar or a vector.

The independent variables, {X}, X.
The dependent variable, {Y}, Y.
A regression model relates Y to a function of X and {β} beta.

$$y=f(x,\beta)$$

The approximation of the points will be formalized in a algebraic equation as E (y|x)=f(x,β).

The regression analysis is carried out by knowing the form of the function f, the form of this function is based on knowledge about the relationship between Y and X and does not rely on the data, therefore f must be specified or a convenient form for f will be chosen. Resulting data will estimate a unique value for β beta that best fits the data in some sense, and the regression model when applied to the data can be viewed as an over determined system or a system of equations. A sample of a regression analysis is shown in FIG. 4.

Computation

In the instant method, the shape of the response surface may be unknown. The predictors are likely to interact in producing the response; in other words, the shape of the response to one predictor is likely to depend on other predictors. The response is either a quantitative or binary variable that can be cross-validated and applied in a predictive way to the standard deviations of each of the 6 best-fit points. One example of a regression model is shown in FIG. 5. Additionally, computer simulation may also be used to simulate the outcomes of a mathematical model associated with said system, said simulations being used to check the reliability of a chosen mathematical model. On possible example of pseudo-code for predicting certain measurements to foot length is shown below:

```
If foot_length == 6 then:
    First_ray = 3.5
    Fifth_ray = 2.9
    Foot_arc = 2.4
    Rear_foot_width = 3.1
    Forefoot_width = 3.08
else if foot_length == 7 then:
    First_ray = 3.4
    Fifth_ray = 2.3
    Foot_arc = 2.2
    Rear_foot_width = 2.8
    Forefoot_width = 3.21
else if foot_length == 8 then:
    First_ray = 3.7
    Fifth_ray = 2.6
    Foot_arc = 2.4
    Rear_foot_width = 3.0
    Forefoot_width = 3.3
```

Example 2

The previous techniques and methods may be incorporated into a single method for manufacturing a footbed as shown in FIG. 6, and with reference to Tables 1-3 below.

A method of manufacturing a footbed may include acquiring data from thousands of foot scans and storing them in a database, each of the foot scans including requesting that the patient place their foot in a sub-talar neutral position prior to scanning (602). The data may be smoothed and filtered based on the average of 1000s of scans that are sorted by shoe size (604). In some examples, the sorting by shoe size is done by creating different groupings of data, each bucket representing a specific shoe size including half-sizes. That is, grouping may be created for size 8, 8.5, 9, 9.5, 10, 10.5, 11, etc. A multivariate linear regression model is created using the techniques discussed above (606). For each of the key foot measurements, differential coefficients are determined (608), and measurements are calculated for each key foot parameter per Table 2 and the formulas below using the differential coefficients:

TABLE 1

Foot Anthropometric Dimensions:

| Measurement | Definition |
|---|---|
| $L_{HW}$ | Heel Width |
| $L_{1MH}$ | Heel to $1^{st}$ Met Head |
| $L_{5MH}$ | Heel to $5^{th}$ Met Head |
| $L_{FFW}$ | Forefoot Width |
| $L_{AL}$ | Arch Length |
| $L_{AH}$ | Arch Height |

TABLE 2

Footbed Dimensions

| Measurement | Definition |
|---|---|
| $M_{HW}$ | Footbed Heel Width |
| $M_{1MH}$ | Heel to $1^{st}$ Met Head |
| $M_{5MH}$ | Heel to $5^{th}$ Met Head |
| $M_{FFW}$ | Forefoot Width |
| $M_{AL}$ | Arch Length |
| $M_{AH}$ | Arch Height |

TABLE 3

Differential Ratio

| Differential Ratio | Definition |
|---|---|
| $D_{HW}$ | Footbed Heel Width |
| $D_{1MH}$ | Heel to $1^{st}$ Met Head |
| $D_{5MH}$ | Heel to $5^{th}$ Met Head |
| $D_{FFW}$ | Forefoot Width |
| $D_{AL}$ | Arch Length |
| $D_{AH}$ | Arch Height |

Formula #1:

Determine foot anthropometric measurement if footbed parameters are known:

$$L = M + [D \cdot N]$$

Formula #2:

Determine footbed parameters if anthropometric parameters are known:

$$M = L - [D \cdot N]$$

Where:
L=Known Value for anthropometric measurement;
M=Known Value from existing footbed;
D=Differential ratio derived from regressed data for each half size;
N=whole number representing the number of increments in shoe size greater than size 6; and:

Thus, each footbed/anthropometric dimension can be determined by calculating the dimension for each of the critical footbed measurement incorporating the parameters for each item listed in Tables 1 and 2 (above), and incorporating the differential coefficient for each key parameter via the product differential ratio "D" and a whole number "N" (614). The result is a footbed model that is almost ready for manufacturing with some adjustments made to ensure proper fitment into a shoe.

A second set of data may be acquired relating to footwear last bottom perimeter from a given shoe (620). The last bottom data may be converted to vector/scalar coordinates (622). As shown in step 620, footbed dimensions from step 614 may be compared to the last bottom perimeter from step 622 to ensure that the footbed will properly fit into the shoe (630). If no adjustments are necessary, a final footbed shape is produced (640). If, however, it is determined that the footbed dimension from step 614 will not fit within last bottom perimeter, then the footbed model may be modified to ensure proper fit (e.g., within one standard deviation). In some examples, a footbed dimension that will not fit within a last bottom perimeter may require additional adjustment (e.g., addition or subtraction) from the footbed dimension.

According to the present disclosure, the footbed has two primary components: (1) the top portion constructed of foam there to provide cushioning, shock absorption, comfort, and pressure distribution, and (2) the bottom portion constructed of a material firmer than the top portion and there to provide shape, support, stability, and pressure distribution. The bottom portion does not extend to the same length as the top portion.

In order to achieve manufacturing efficiencies, the bottom portion, which is typically molded and therefore more expensive, scales differently than the top portion. There are fewer sizes of the bottom portion. Typically, two sizes of the top portion are used with one size of the bottom portion and, therefore, fewer molds are needed to produce a complete set of sizes for the footbed. For example, footbed size items 9 & 9.5 would use a one size of the bottom portion combined with two sizes of the upper portion. In certain examples, care is taken to ensure that the firmer bottom portion is aligned/graded according to the foot's anatomy so that negative effects do not occur. To ensure proper fitment, (a) the distal edge of the of the bottom portion is always at least ½ inch proximal to the MP Joints, (b) the width of the proximal end of the bottom portion is ½ the distance from the 1st MPJ to the 5th MPJ, and (c) the width of the bottom portion at the widest part of the heel is ⅛" wider than the heel (anatomical heel).

The shape and stiffness of the arch is important for comfort, support, and stable control of the foot. To accommodate personal preferences of comfort in the arch, 3 levels of stiffness are provided for the footbed instead of formulating a different arch shape for each patient. This provides 3 levels of arch stiffness per size to accommodate different arch dynamics and personal preference.

In some examples, the flexural modulus (the ratio of flex stress and flex strain) of the footbed, determined via 3-point bending tests may be varied. The flexural modulus may be calculated according to the following equation:

$$E = (L^3 * F) / (4 * b * h^3 * y)$$

where:
F=flexural modulus
L=Span length of test specimen
F=Load
b=width of test specimen
h=thickness of test specimen
y=displacement In at least some examples, a first footbed may be formed of a first flexural modulus, a second footbed may be formed of a second flexural modulus that is approximately half of the first flexural modulus, and a third flexural modulus may be formed of a third flexural modulus that is approximately half of the second flexural modulus. For example, three footbeds of generally the same shape and size may be formed as follows:

Stiffest with a flexural modulus of 1094
Medium with a flexural modulus of 525
Least stiff with a flexural modulus of 229

The present disclosure also contemplates a unique shape for the heel cutout. This cutout allows the top portion of the footbed, typically softer, shock absorbing material, to protrude through the stiffer material in the bottom portion and provides some benefits. The shape of the cutout in the heel is unique and derived by examining critical anatomical points on the heel bone (calcaneus). The posterior portion of the calcaneus has condyles/tuberosities. A condyle or tuberosity is a portion of a bone where ligaments and tendons can attach to the bone and is typically a small projection of the bone that gives the tendon or ligament a place to attached on to, as opposed to a perfectly smooth bone portion that would make attachment more difficult.

The tuberosity/condyle projections on the posterior surface of the heel are connection points for a number of connective tissues with the plantar fascia being one of the primary connections. The cutout, shaped as a guitar pick, provides additional cushioning and shock absorption at the calcaneal tuberosity. This connection point is often the site of inflammation of the plantar fascia, commonly known as plantar fasciitis, which causes pain and soreness and affects many individuals.

The shape of the guitar pick cutout is configured and arranged to provide cushioning and shock absorption at critical anatomical points to guard against plantar fasciitis due to prolonged trauma in the heel, but does not reduce the support and control at the heel that is provided by the firmer bottom portion of the footbed.

Providing a larger cutout with softer material projecting through the bottom portion of the footbed might guard against heel trauma, but may come at a cost of reduced stability and control at the heel. The ideal "guitar pick" shape provides the needed cushioning and shock absorption without loss of stability and control.

It will be appreciated that the various dependent claims and the features set forth therein can be combined in different ways than presented in the initial claims. It will also be appreciated that the features described in connection with individual embodiments may be shared with others of the described embodiments.

What is claimed is:

1. A method of manufacturing a foot insert comprising:
choosing a sample patient population;
positioning each patient's foot in a sub-talar neutral position;
collecting three-dimensional data of at least one foot of each patient in a scan, and placing the scan in a collection of scans representing the sample patient population;
separating the collection of scans into groupings based on each patient's preferred shoe size;
aligning the scans within each grouping by using correspondence point pairs;
obtaining contour data from the scans;
applying at least one filter to the scans;
averaging the scans;
obtaining seven representative measurements for each grouping, the seven representative measurements including forefoot width, rearfoot width, arch height, arch length, heel-to-head of first metatarsal phalangeal joint, heel-to-head of fifth metatarsal phalangeal joint, and foot length; and
modeling an insole based on the seven representative measurements;
wherein modeling an insole based on the seven representative measurements includes determining a footbed dimension from an anthropometric dimension and a differential coefficient for at least one shoe size.

2. The method of claim 1, further comprising the step of creating a multivariate linear regression model.

3. The method of claim 2, further comprising the step of training the model based on at least 500 samples of the data.

4. The method of claim 3, further comprising the step of testing the accuracy of the model.

5. A method of manufacturing a foot insert comprising:
choosing a sample patient population;
positioning each patient's foot in a sub-talar neutral position;
collecting three-dimensional data of at least one foot of each patient in a scan, and placing the scan in a collection of scans representing the sample patient population;
separating the collection of scans into groupings based on each patient's preferred shoe size;
aligning the scans within each grouping by using correspondence point pairs;
obtaining contour data from the scans;
applying at least one filter to the scans;
averaging the scans;
obtaining seven representative measurements for each grouping, the seven representative measurements including forefoot width, rearfoot width, arch height, arch length, heel-to-head of first metatarsal phalangeal joint, heel-to-head of fifth metatarsal phalangeal joint, and foot length;
modeling an insole based on the seven representative measurements;
and using a nonparametric multiplicative regression to estimate at least one of the seven representative measurement based on another one of the seven representative measurements.

6. The method of claim 5, wherein estimating at least one of the seven representative measurement includes estimating at least one of the forefoot width, the rearfoot width, the arch height, the arch length, the heel-to-head of first metatarsal phalangeal joint, and the heel-to-head of fifth metatarsal phalangeal joint.

7. The method of claim 6, wherein estimating at least one of the seven representative measurement includes estimating each of the forefoot width, the rearfoot width, the arch height, the arch length, the heel-to-head of first metatarsal phalangeal joint, and the heel-to-head of fifth metatarsal phalangeal joint.

8. A method of manufacturing a foot insert comprising:
choosing a sample patient population;
positioning each patient's foot in a sub-talar neutral position;
collecting three-dimensional data of at least one foot of each patient in a scan, and placing the scan in a collection of scans representing the sample patient population;
separating the collection of scans into groupings based on each patient's preferred shoe size;
aligning the scans within each grouping by using correspondence point pairs;
obtaining contour data from the scans;

applying at least one filter to the scans;
averaging the scans;
obtaining seven representative measurements for each grouping, the seven representative measurements including forefoot width, rearfoot width, arch height, arch length, heel-to-head of first metatarsal phalangeal joint, heel-to-head of fifth metatarsal phalangeal joint, and foot length;
modeling an insole based on the seven representative measurements;
adjusting the insole based on acquired data from footwear including adjusting the insole based on a footwear last bottom perimeter; and
converting last bottom data to vector and scalar coordinates and comparing the vector and scalar coordinated to the modeled insole.

\* \* \* \* \*